July 8, 1969   J. R. WILLSON   3,454,222
VALVE CONSTRUCTION AND PARTS THEREFOR OR THE LIKE
Original Filed July 30, 1965   Sheet 2 of 2

INVENTOR
JAMES R. WILLSON

BY Cauden & Cauden

HIS ATTORNEYS

United States Patent Office 3,454,222
Patented July 8, 1969

3,454,222
VALVE CONSTRUCTION AND PARTS THEREFOR OR THE LIKE
James R. Willson, Greensburg, Pa., assignor to Robertshaw Controls Company, Richmond, Va., a corporation of Delaware
Continuation of application Ser. No. 475,922, July 30, 1965. This application May 27, 1968, Ser. No. 739,975
Int. Cl. G05d 23/12; F23n 1/00; F16k 25/00
U.S. Cl. 236—99         9 Claims

ABSTRACT OF THE DISCLOSURE

This disclosure relates to a valve construction having a valve seat member provided with two spaced and offset shoulders facing in the same direction as the valve seat thereof and respectively compressing a single resilient sealing member against cooperating shoulder means on a housing member to define a first chamber between the shoulder means of the valve seat member that is interconnected to an inlet and to define a chamber on the other side of the valve seat member that is interconnected to the outlet, the valve seat member carrying a valve member disposed in the other chamber for opening and closing the valve seat thereof.

---

This application is a continuation of application Ser. No. 475,922, filed July 30, 1965, and now abandoned.

This invention relates to an improved valve construction for a fuel control system or the like as well as to improved parts for such a valve construction or the like.

The valve construction of this invention is particularly adaptable to be utilized with a fuel control system which controls the operation of a burner means for a domestic oven or the like.

The valve construction of this invention is relatively simple to manufacture and assemble in its particular control device while still performing the necessary functions in the operation of the control device.

Accordingly, it is an object of this invention to provide an improved valve construction having one or more of the novel features of this invention as set forth above or hereinafter shown or described.

Another object of this invention is to provide an improved part for such a valve construction or the like.

Other objects, uses and advantages of this invention are apparent from the reading of this description which proceeds with reference to the accompanying drawings forming a part thereof and wherein:

FIGURE 5 is an enlarged, fragmentary, cross-sectional view similar to FIGURE 2 but merely illustrates the valve construction of this invention.

Figure 1:
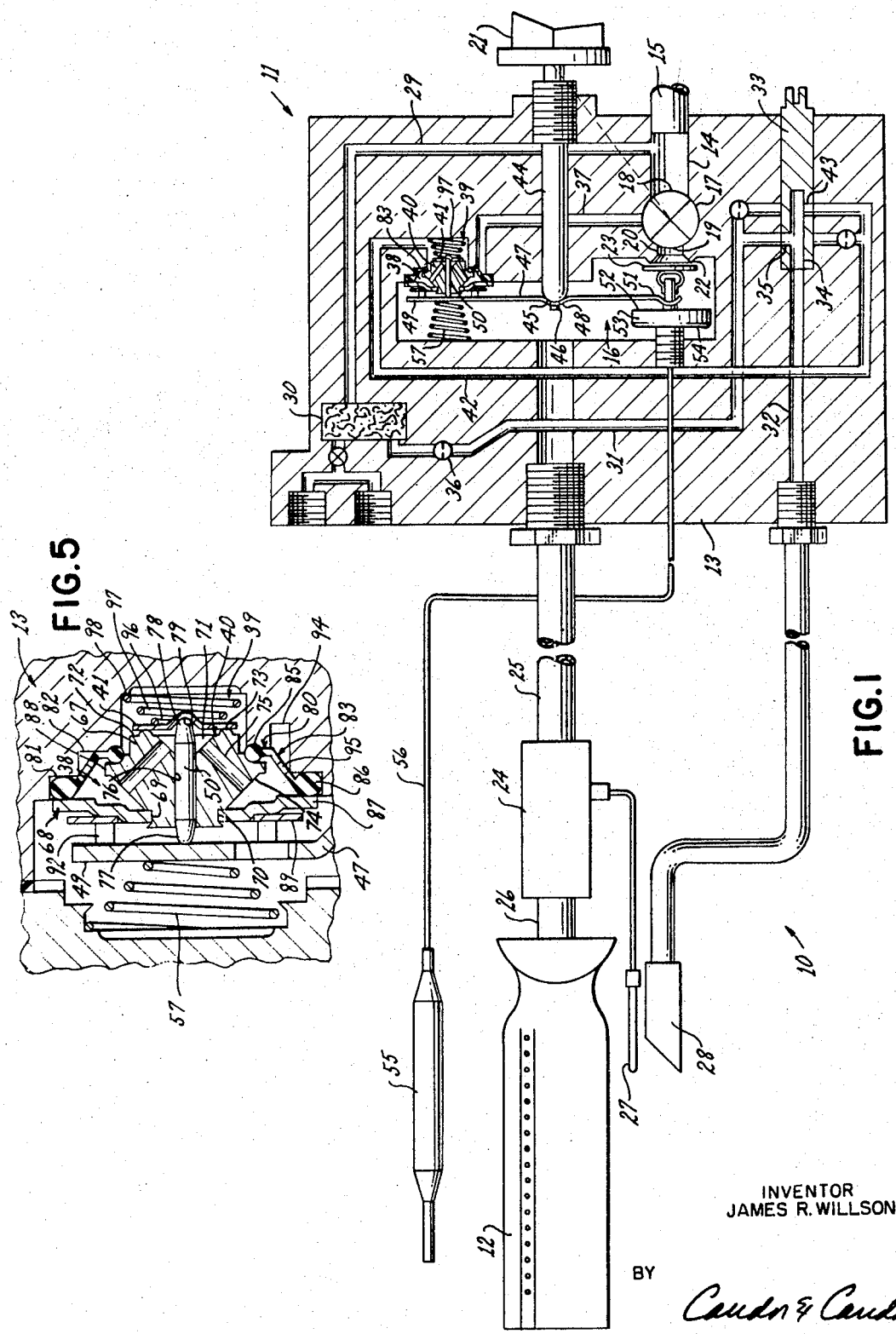
FIGURE 1 is a schematic cross-sectional view illustrating the improved system of this invention.

Referring now to FIGURE 1, an improved control system of this invention is generally indicated by the reference numeral 10 and includes a control device 11 for controlling the operation of a main burner means 12 disposed in a suitable oven or the like.

The control device 11 includes a housing means 13 provided with an inlet passage 14 adapted to be interconnected to a fuel supply conduit 15 in any suitable manner, the fuel inlet 14 being separated from a chamber 16 by a disc-shaped valve member 17 which interconnects the inlet part 18 of the passage 14 to an outlet part 19 of a passage means 20 when the valve member 17 is moved to an open position by a control knob 21 in a manner hereinafter set forth.

The passage 20 is interconnected to the chamber 16 by a valve seat 22 adapted to be opened and closed by a valve member 23 in a manner hereinafter set forth.

The chamber 16 is interconnected to a safety valve 24 by a conduit 25, the safety valve 24 having the outlet side thereof interconnected to the burner means 12 by a conduit 26. The safety valve 24 is only adapted to interconnect the conduit 25 with the conduit 26 when a temperature sensing bulb 27 senses that a large heater flame exists at a pilot burner 28. Thus, when no large heater flame exists at the pilot burner 28, the safety valve 24 closes and terminates the flow of fuel to the main burner means 12. However, when the large heater flame again appears at the pilot burner 28 in a manner hereinafter described, the safety valve 24 opens and interconnects the conduit 25 to the conduit 26 whereby fuel issuing from the main burner 12 can be ignited by the flame at the pilot burner 28.

A passage 29 is formed in the housing 13 and leads from the fuel inlet 14 at a point upstream from the disc valve 17 to a filter chamber 30 and, from the filter chamber 30 through a passage means 31 interconnected to a passage 32 by a pilot burner selector key 33, the selector key 33 having a longitudinal bore 34 interconnected to a transverse bore 35 aligned with the passage means 31.

In this manner, even though the disc valve 17 is disposed in a closed position thereof, a small amount of fuel continuously passes through an orifice 36 in the passage means 31 to the pilot burner 28 to produce a small standby flame. However, this small standby flame is not sufficient to heat the bulb 27 to cause opening of the safety valve 24.

When the disc valve 17 is moved to an open position by the control knob 21 to interconnect the side 18 with the side 19, the same also opens a passage 37 to the fuel supply conduit 15 with the passage 37 leading to a chamber 38. The chamber 38 is separated from another chamber 39 by a valve seat member 40 which is opened and closed by a valve member 41 in a manner hereinafter described.

The chamber 38 is interconected to a passage 42 leading to a transverse bore 43 in the adjusting key 33 whereby when the valve member 41 is opened, and the disc valve 17 is opened, an adidtional flow of fuel is directed through the passage means 42 to the pilot burner 28 to increase the flow of fuel issuing from the pilot burner 28 to form a heater flame which will be sensed by the bulb 27 to open the safety valve 24 in a manner hereinafter described.

An axially movable fulcrum pin 44 is carried by the housing means 13 and has a rounded end 45 provided with a reduced cylindrical extension 46, the axial position of the fulcrum pin 44 being controlled by the control knob 21 in a manner hereinafter described.

A lever 47 has an intermediate portion 48 thereof fulcrumed on the end 45 of the fulcrum pin 44 whereby one end 49 of the lever 47 is adapted to engage the plunger 50 passing through the valve seat member 40 and engaging the valve member 41, the end 49 of the lever 47 normally being urged in a clockwise direction by a compression spring 57 disposed between the housing means 13 and the end 49 of the lever 47. The other end 51 of the lever 47 bears against a movable wall 52 of an expansible and contractible element 53 having a wall 54 fixed to the housing means 13.

The interior of the expansible and contractible element 53 is interconnected to a temperature sensing bulb 55 disposed in the oven by a conduit means 56. In this manner, the movable wall 52 moves to the right in FIGURE 1 upon an increase in temperature in the oven sensed by the bulb 55 and moves to the left upon a decrease in temperature sensed by the temperature sensing bulb 55 for a purpose hereinafter described.

The movable wall 52 of the expansible and contractible element 53 carries a valve member 23 for opening and closing the valve seat 22 in the manner hereinafter described.

Figure 2:
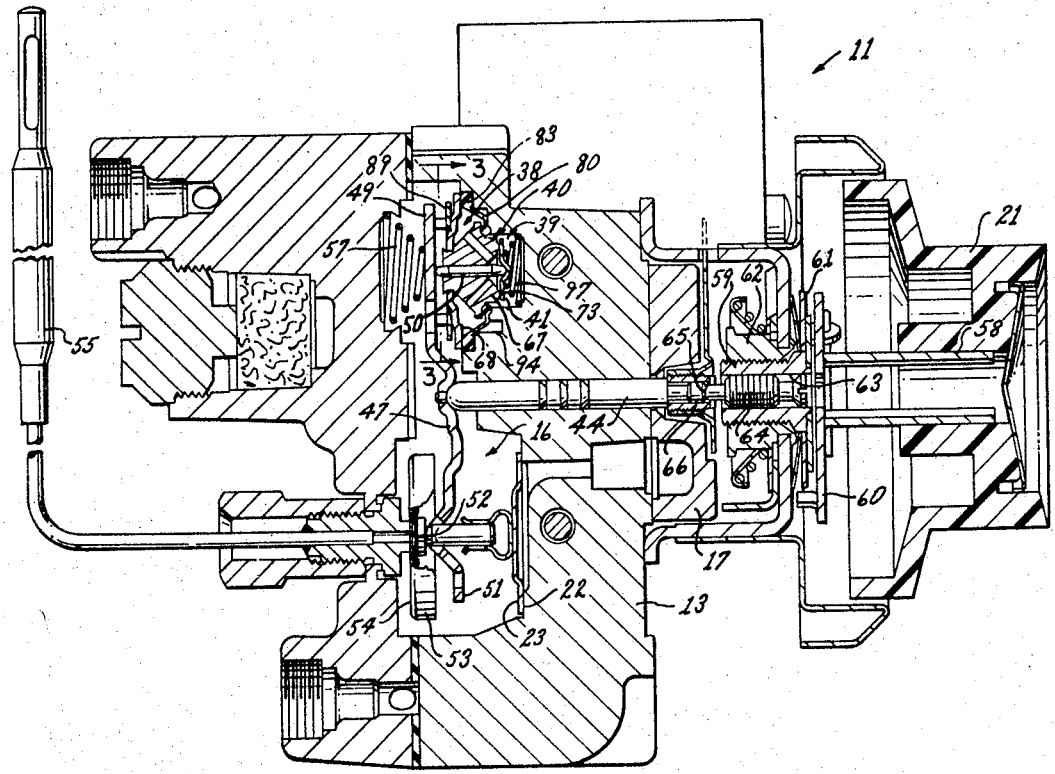
FIGURE 2 is an enlarged, fragmentary, cross-sectional view of the control device of this invention.
Figure 4:
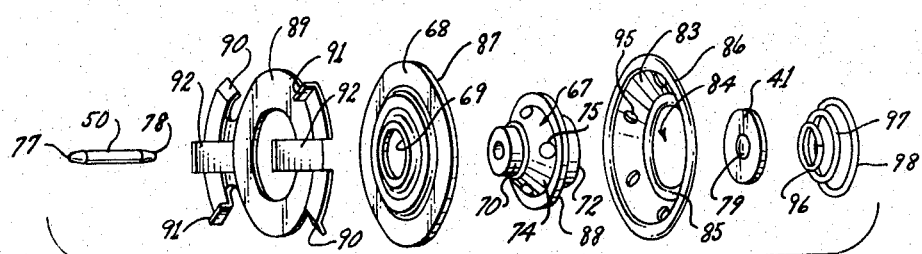
FIGURE 4 is an exploded perspective view of the various parts of the valve construction of FIGURE 2.

As illustrated in FIGURE 2, the control knob 21 is carried on a shaft member 58 interconnected to an externally threaded adjusting member 59 by plate means 60 and 61 whereby rotation of the knob 21 causes simultaneous rotation of the adjusting member 59, the adjusting member 59 being threaded in an internally threaded member 62 carried by the housing means 13. The adjusting member 59 has a threaded bore 63 passing therethrough and threadedly receiving an adjusting screw 64 having an end 65 abutting the other end 66 of the fulcrum pin 44.

The disc valve 17 in FIGURE 2 is operatively interconnected to the control knob 21 by clutch means so that when the control knob 21 is moved from an "off" position thereof to an "on" position, the same rotates the disc valve 17 from an "off" position thereof to an "on" position to interconnect the ports 18 and 19 in FIGURE 1 as well as to interconnect the port 18 to the passage means 37. However, further movement of the control knob 21 to a higher temperature setting does not cause further movement of the disc valve 17 even though the adjusting member 59 is moved relative to the housing 13 to adjust the position of the fulcrum pin 44.

The valve construction 40, 41 will now be described in detail.

As illustrated in FIGURES 2–5, the valve seat member 40 comprises two parts 67 and 68, the member 68 being substantially disc-shaped and having an aperture 69 passing therethrough to receive a cylindrical extension 70 of the part 67 whereby the cylindrical extension 70 can be peened over in the manner illustrated in FIGURES 2 and 5 to fasten the parts 67 and 68 together.

The part 67 has a recess 71 formed in the end 72 thereof with the recess 71 being surrounded by an annular projecting valve seat 73 to be opened and closed by the valve member 41 in a manner hereinafter described. The recess 71 in the valve seat member 40 is interconnected to the side 74 of the part 67 by a plurality of angularly disposed passage means 75.

A longitudinal bore 76 passes through the valve seat part 67 and interrupts the end 72 thereof to receive the plunger or pin 50, one end 77 of the pin 50 being engaged by the end 49 of the lever 47 and the other end 78 of the pin being received in the recess 79 of the valve member 41.

The housing 13 has a stepped bore 80 provided therein and defining two annular shoulders 81 and 82. A resilient sealing member 83 is provided and is substantially cup-shaped with an open end 84 defined by an annular bead 85, the other end of the flexible member 83 having an annular bead 86.

When the sealing member is disposed in the stepped bore 80 of the housing 13 in the manner illustrated in FIGURES 2 and 5, the annular beads 86 and 85 thereof respectively rest on the shoulders 81 and 82 thereof in the manner illustrated in FIGURES 2 and 5.

When the valve seat member 40 is disposed in the stepped bore 80, an annular shoulder 87 of the part 68 engages the bead 86 of the sealing member 83 while an annular shoulder 88 of the part 67 engages the annular bead 85 to compress the annular beads 86 and 85 against the shoulders 81 and 82 to provide a fluid seal therewith whereby the valve seat member 40 in cooperation with the sealing means 83 defines the two chambers 38 and 39 previously described and separated from the main chamber 16 in a manner hereinafter described.

In order to maintain the shoulders 87 and 88 in compression against the sealing beads 86 and 85 of the sealing 83, a plate-like member 89 is provided and has a pair of resilient fingers 90 extending in one direction. A pair of stop tangs 91 extend from the plate member 89 in the other direction while a pair of adjusting tangs 92 also extend in the other direction.

Figure 3:
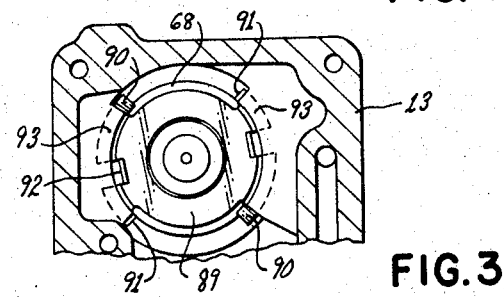
FIGURE 3 is a fragmentary cross-sectional view taken on lines 3—3 of FIGURE 2.

As illustrated in FIGURE 3, the housing 13 has a pair of embossments 93 under which the member 89 can be disposed and rotated in a clockwise direction in FIGURE 3 by the tangs 92 thereof until the stop tangs 91 respectively engage the embossments 93 illustrated in FIGURE 3. In this manner, the spring fingers 90 of the plate member 89 push downwardly on the part 68 of the valve seat member 40 to cause the shoulders 87 and 88 thereof to compress the beads 86 and 85 of the sealing member 83 against the shoulders 81 and 82 of the housing 13 to seal the chambers 38 and 39 from each other.

The passage 37 in the housing 13 intersects an annular portion 94 of the stepped bore 80 of the housing 13 intermediate the shoulders 81 and 82 thereof whereby the annular portion 94 of the stepped bore 80 is interconnected to the chamber 38 by a plurality of apertures 95 passing through the sealing member 83 intermediate the beads 85 and 86 thereof.

When the valve seat member 40, sealing member 83 and spring plate 89 are assembled in the stepped bore 80, the valve member 41 is placed first therein against one end 96 of a compression spring 97 having the other end 98 thereof disposed against the housing 13 whereby the compression spring 97 tends to maintain the valve member 41 in its closed position against the valve seat 73 to prevent fluid communication between the chambers 38 and 39.

Thus, it can be seen that the valve construction 40, 41 of this invention is relatively simple to manufacture and assemble to perform a valving function in a manner hereinafter described.

The operation of the system 10 and the control device 11 of this invention will now be described.

When the system 10 is installed in a domestic appliance for a consumer's home, the adjusting key 33 is adjusted from an "off" position thereof to the position illustrated in FIGURE 1 whereby even though the control knob 21 is disposed in its off position, a minimum amount of fuel flows through the passage means 31 to the pilot burner 28 to produce a small standby flame which will continuously burn and will not affect the safety valve 24 which remains in its closed position.

When the operator desires to turn on the control device 11, the control knob 21 is rotated in the proper direction from the "off" position thereof whereby the disc valve 17 is moved from the closed position thereof to the open position thereof to interconnect the inlet 18 with the outlet 19 as well as to the passage means 37 whereby fuel is adapted to flow from the manifold 15 to the chamber 38 and to the chamber 16.

Rotational movement of the control knob 21 from the "off" position to a particular setting position causes the adjusting member 59 to be moved to the right in FIGURE 2 to permit the fulcrum pin 44 to move to the right therewith under the force of the compression spring 57, whereby the lever 47 is disposed in a set position thereof.

Since the temperature of the oven is below the temperature set by the control knob 21 and, thus by the fulcrum pin 44, the movable wall 52 of the power element 53 is disposed in such a position to the left in FIGURE 2 that the valve member 23 is disposed in an open position and the force of the compression spring 57 has pivoted the end 49 of the lever 47 to the right to move the plunger 50 and open the valve member 41 away from the valve seat 73 so that fuel in the chamber 38 can now flow to the chamber 39 and by means of the passage 42 to the pilot burner 28 to produce a large heater flame. The heater flame at the pilot burner 28 is sensed by the bulb 27 which causes the safety valve 24 to open so that fuel in the chamber 16 of the housing 13 can now be directed to the burner means 12 and be ignited by the pilot burner 28.

Thus, as long as the temperature of the oven is below the selected temperature, the valve member 41 is opened so that fuel can issue from the main burner 12 to heat the oven.

However, when the temperature of the oven reaches the selected temperature, the movable wall 52 of the power element 53 has moved to the right in FIGURE 2 a distance sufficient to cause the lever 47 to pivot to the position illustrated in FIGURE 2 so that the valve member 41 will seat against the valve seat 73 and prevent the additional flow of fuel to the pilot burner 28. Thus, the large heater flame at the pilot burner 28 is terminated even though a small standby flame still remains. In this manner, the temperature bulb 27 of the safety valve 24 senses that a heater flame no longer exists at pilot burner 28 and, thus, closes the safety valve 24 to prevent the flow of fuel to the main burner means 12.

Thus, when the temperature of the oven again falls below the selected temperature, the lever 47 is pivoted in such a manner that the same opens the valve member 41 so that the heater flame can again exist at the pilot burner 28 to open the safety valve 24 to operate the main burner 12.

In this manner, the main burner 12 is cycled on and off by means of the valve member 41 to maintain the temperature of the oven at the selected temperature.

The valve member 23 merely acts as a high limit valve so that if during the operation of the oven in the above manner, the small valve 41 should remain open through malfunction or the like, whereby a runaway condition could exist in the oven, the movable wall 52 of the expansible element 53 moves to the right in FIGURE 2 a distance sufficient to cause the valve 23 to approach the valve seat 22 whereby the same throttles the flow of fuel to the burner means 12 so that the burner means 12 can not produce a temperature in the oven above a safe limit thereof.

When it is desired to turn off the oven, the operator rotates the knob 21 back to its "off" position whereby not only is the fulcrum pin 44 axially moved to the left in FIGURE 2, but also the control knob 21 is again interconnected by the clutch means to the disc valve 17 to move the same to the "off" position whereby the supply conduit 15 is disconnected from the passage means 37 and the chamber 16 so that no fuel can pass to the main burner means 12. In addition, the fulcrum pin 44 is moved to an axial position such that regardless of the temperature of the oven, the lever 47 will maintain the valve member 41 in its closed position.

Therefore, it can be seen that this invention not only provides an improved valve construction having many novel features, but also this invention provides improved parts for such a valve construction or the like.

What is claimed is:

1. In combination, a housing having an inlet and an outlet, a self-contained valve seat member disposed between said inlet and said outlet and having an end surface provided with a valve seat thereon, said valve seat member having two spaced offset portions facing in the same direction as said valve seat thereof and sealed against said housing to define two chambers therewith and respectively interconnected to said inlet and said outlet, said valve seat members having passage means for interconnecting said two chambers together with one end of said passage means being disposed between said offset portions and the other end of said passage means interrupting said end surface inboard of said valve seat of said valve seat member, a valve member for opening and closing said valve seat, said valve seat member having a bore passing therethrough and interrupting said end surface inboard of said valve seat and spaced from said other end of said passage means, and an axially movable plunger carried in said bore of said valve seat member and being operatively interconnected to said valve seat member whereby the axial movement of said plunger in said bore does not impede fluid flow through said passage means.

2. A combination as set forth in claim 1 wherein a lever is carried by said housing and operates said plunger.

3. A combination as set forth in claim 1 wherein a single flexible gasket has spaced portions thereof respectively disposed between said portions of said valve seat member and said shoulders.

4. A combination as set forth in claim 1 wherein said two portions of said valve seat member are separate parts secured together.

5. A combination as set forth in claim 1 wherein spring means carried by said housing normally urges said valve member to a closed position thereof.

6. In combination, a housing having an inlet and an outlet, a self-contained valve seat member disposed between said inlet and said outlet, said valve seat member having two spaced offset portions facing in the same direction as the valve seat thereof and sealed against said housing to define two chambers therewith and respectively interconnected to said inlet and said outlet, said valve seat member having passage means for interconnecting said two chambers together with one end of said passage means being disposed between said offset portions and the other end of said passage means leading to the valve seat of said valve seat member, a valve member for opening and closing said valve seat, said valve seat member having a bore passing therethrough and separate from said passage means, an axially movable plunger carried in said bore of said valve seat member and being operatively interconnected to said valve seat member, a lever being carried by said housing and operating said plunger, and a thermostat operates said lever.

7. A combination as set forth in claim 6 wherein said housing carries means to adjust the position of said lever.

8. A self-contained valve seat member having an end surface provided with a valve seat thereon and having two spaced offset shoulders facing in the same direction as said valve seat thereof for respectively sealing against two shoulders of a housing to divide said housing into two chambers respectively interconnected to an inlet and an outlet of said housing, said valve seat member having a passage means for interconnecting said chambers together and leading to said valve seat to be located in one of said chambers with one end of said passage means being disposed between said offset shoulders and the other end of said passage means interrupting said end surface inboard of said valve seat of said valve seat member, said valve seat member having a bore passing therethrough and interrupting said end surface inboard of said valve seat and spaced from said other end of said passage means to receive a plunger for projecting through said valve seat to operate a valve member for opening and closing said valve seat whereby movement of said plunger in said bore will not impede fluid flow through said passage means.

9. A valve seat member as set forth in claim 8 wherein said two shoulders of said valve seat member comprise two separate parts interconnected together.

References Cited

UNITED STATES PATENTS

| | | | |
|---|---|---|---|
| 1,412,722 | 4/1922 | Tibble | 137—454.2 |
| 1,562,679 | 11/1925 | Muend | 137—454.5 |
| 2,508,843 | 5/1950 | Semak | 137—454.2 XR |
| 3,204,654 | 9/1965 | Moen | 137—119 |

HENRY T. KLINKSIEK, *Primary Examiner.*

U.S. Cl. X.R.

137—454.2; 236—15; 251—363